(12) United States Patent
Boussand

(10) Patent No.: US 8,858,824 B2
(45) Date of Patent: Oct. 14, 2014

(54) COMPOSITION COMPRISING 2,3,3,3-TETRAFLUOROPROPENE

(75) Inventor: Beatrice Boussand, Sainte Foy les Lyon (FR)

(73) Assignee: Arkema France, Colombes (FR)

( * ) Notice: Subject to any disclaimer, the term of this patent is extended or adjusted under 35 U.S.C. 154(b) by 180 days.

(21) Appl. No.: 13/704,272

(22) PCT Filed: Jun. 7, 2011

(86) PCT No.: PCT/FR2011/051283
§ 371 (c)(1),
(2), (4) Date: Dec. 14, 2012

(87) PCT Pub. No.: WO2012/001255
PCT Pub. Date: Jan. 5, 2012

(65) Prior Publication Data
US 2013/0092869 A1 Apr. 18, 2013

Related U.S. Application Data

(60) Provisional application No. 61/364,536, filed on Jul. 15, 2010.

(30) Foreign Application Priority Data

Jun. 30, 2010 (FR) ..................................... 10 02749

(51) Int. Cl.
*C09K 5/04* (2006.01)
*C10M 105/38* (2006.01)
*C10M 171/00* (2006.01)

(52) U.S. Cl.
CPC .............. *C09K 5/045* (2013.01); *C10M 105/38* (2013.01); *C10M 171/008* (2013.01); *C09K 2205/126* (2013.01); *C09K 2205/22* (2013.01); *C10M 2207/2835* (2013.01); *C10M 2207/289* (2013.01); *C10N 2220/302* (2013.01); *C10N 2230/12* (2013.01); *C10N 2240/30* (2013.01)
USPC .................................. 252/68; 252/67; 252/69

(58) Field of Classification Search
CPC ....... C09K 5/04; C09K 5/045; C10M 105/38; C10M 171/008
USPC .................................................. 252/68, 67, 69
See application file for complete search history.

(56) References Cited

U.S. PATENT DOCUMENTS

| | | | |
|---|---|---|---|
| 5,895,778 A | 4/1999 | McHenry et al. | |
| 7,534,366 B2 | 5/2009 | Singh et al. | |
| 2008/0111099 A1 | 5/2008 | Singh et al. | |
| 2008/0135817 A1* | 6/2008 | Luly et al. | 252/571 |
| 2010/0029997 A1* | 2/2010 | Wang et al. | 570/134 |
| 2010/0038582 A1 | 2/2010 | Shimomura et al. | |
| 2012/0065437 A1* | 3/2012 | Merkel et al. | 570/175 |
| 2013/0105724 A1* | 5/2013 | Boussand | 252/68 |
| 2014/0018582 A1* | 1/2014 | Sun et al. | 570/155 |

FOREIGN PATENT DOCUMENTS

| | | |
|---|---|---|
| EP | 2 149 543 A1 | 2/2010 |
| JP | H4-110388 | 4/1992 |
| WO | WO 2010/029704 A1 | 3/2010 |

* cited by examiner

*Primary Examiner* — Douglas McGinty
(74) *Attorney, Agent, or Firm* — Steven D. Boyd

(57) ABSTRACT

The invention relates to a composition comprising a lubricant based on polyol esters (POE) and a refrigerant F including at least 99.8 wt % 2,3,3,3-tetrafluoropropene, between 0.5 and 500 ppm 1,1,1,2,3-pentafluoropropene, between 0.5 and 500 ppm trifluoropropyne and between 1 and 500 ppm compounds based on 2 or 3 carbon atoms optionally including an olefinic bond.

9 Claims, No Drawings

COMPOSITION COMPRISING 2,3,3,3-TETRAFLUOROPROPENE

This application is the national phase under 35 USC §371 of prior PCT International Application Number PCT/FR2011/051283 filed Jun. 7, 2011 which designated the United States of America and claims priority to U.S. Provisional Patent Application Ser. No. 61/364,536 filed Jul. 15, 2010 which claims priority to French Patent Application Serial Number FR10.02749 filed Jun. 30, 2010.

FIELD OF THE INVENTION

The present invention relates to a composition containing 2,3,3,3-tetrafluoropropene and a lubricant, capable of being used in air conditioning.

BACKGROUND OF THE INVENTION

The problems presented by substances which deplete the atmospheric ozone layer were dealt with at Montreal, where the protocol was signed imposing a reduction in the production and use of chlorofluorocarbons (CFCs). This protocol has been the subject of amendments which have required the abandoning of CFCs and have extended regulation to other products, including hydrochlorofluorocarbons (HCFCs).

The refrigeration and air conditioning industry has invested a great deal in the replacement of these refrigerants and it is because of this that hydrofluorocarbons (HFCs) have been marketed.

In the motor vehicle industry, the air conditioning systems of commercial vehicles have been changed in many countries from a chlorofluorocarbon (CFC-12) refrigerant to a hydrofluorocarbon (1,1,1,2-tetrafluoroethane: HFC-134a) refrigerant, which is less harmful to the ozone layer. However, from the viewpoint of the objectives set by the Kyoto protocol, HFC-134a (GWP=1430) is regarded as having a high heating power. The contribution of a refrigerant to the greenhouse effect is quantified by a criterion, the GWP (Global Warming Potential), which summarizes the heating power by taking a reference value of 1 for carbon dioxide.

Hydrofluoroolefins (HFOs) have a low heating power and thus meet the objectives set by the Kyoto protocol. Document JP 4-110388 discloses 2,3,3,3-tetrafluoropropene (HFO-1234yf) as a heat transfer agent in refrigeration, air conditioning and heat pumps.

In the industrial sector, the refrigerating machines most commonly used are based on cooling by evaporation of a liquid refrigerant. After vaporization, the refrigerant is compressed and then cooled in order to return to the liquid state and thus continue the cycle.

For economic reasons, refrigerant compressors are very often reciprocating compressors with lubricated cylinders. In general, internal lubrication of the compressors is essential in order to reduce wear and heating of the moving members, complete their leaktightness and protect them against corrosion.

The principal characteristics required of oils intended for refrigerant compressor lubrication are miscibility with the refrigerant, solubility, and thermal and chemical stability.

Thus, polyalkylene glycols (PAGs) have been developed as lubricants of HFC-134a in motor vehicle air conditioning.

Document U.S. Pat. No. 7,534,366 recommends the use of a PAG, in the form of a homopolymer or copolymer consisting of 2or more oxypropylene groups and having a viscosity of 10 to 200 centiStokes at 37° C., in combination with HFO-1234yf in air conditioning.

DETAILED DESCRIPTION OF THE INVENTION

The applicant has now developed a refrigerant and lubricant pairing which can be used in air conditioning.

A subject of the present application is therefore a composition comprising at least one lubricant based on polyol esters (POEs) and a refrigerant F comprising at least 99.8% by weight of 2,3,3,3-tetrafluoropropene, from 0.5 to 500 ppm of 1,1,1,2,3-pentafluoropropene, from 0.5 to 500 ppm of 3,3,3-trifluoropropyne and from 1 to 1500 ppm of compounds containing 2 or 3 carbon atoms, optionally comprising an olefin bond (with the exclusion of HFO-1225ye and 3,3,3-trifluoropropyne).

Polyol esters are obtained by reaction of a polyol (an alcohol containing at least 2 hydroxyl groups —OH) with a monofunctional or plurifunctional carboxylic acid or with a mixture of monofunctional carboxylic acids. The water formed during this reaction is eliminated in order to prevent the reverse reaction (i.e. hydrolysis). This is because polyol esters are capable of reacting with water under certain conditions so as to reproduce the polyol.

The applicant has discovered that, despite this prejudice, it is possible to use the refrigerant F with POE in air conditioning, in particular in motor vehicle air conditioning where the risk of entry of moisture is higher. Generally, a motor vehicle air conditioning circuit comprises a drying filter such that the moisture level does not exceed approximately 1000 ppm.

According to the present invention, the preferred polyols are those having a neopentyl backbone, such as neopentyl glycol, trimethylol propane, pentaerythritol and dipentaerythritol; pentaerythritol is the preferred polyol.

The carboxylic acids may contain from 2 to 15 carbon atoms, it being possible for the carbon backbone to be linear or branched. Mention may in particular be made of n-pentanoic acid, n-hexanoic acid, n-heptanoic acid, n-octanoic acid, 2-ethylhexanoic acid, 2,2-dimethylpentanoic acid, 3,5,5-trimethylhexanoic acid, adipic acid and succinic acid, and mixtures thereof.

Some alcohol functions are not esterified, but their proportion remains low. Thus, the POEs can comprise between 0 and 5 relative mol % of $CH_2$—OH units relative to the —$CH_2$—O—(C|O)— units.

The preferred POE lubricants are those having a viscosity of from 1 to 1000 centiStokes (cSt) at 40° C., preferably from 10 to 200 cSt, and advantageously from 30 to 80 cSt.

Preferably, the composition according to the invention comprises at least one lubricant based on polyol esters (POEs), and a refrigerant F comprising at least 99.9% by weight of 2,3,3,3-tetrafluoropropene, from 0.5 to 250 ppm of 1,1,1,2,3-pentafluoropropene, from 0.5 to 250 ppm of 3,3,3-trifluoropropyne and from 1 to 500 ppm of compounds containing 2 or 3 carbon atoms, optionally comprising an olefinic bond (with the exclusion of HFO-1225ye and 3,3,3-trifluoropropyne).

The composition which is particularly preferred comprises at least one lubricant based on polyol esters (POEs), and a refrigerant F comprising at least 99.95% by weight of 2,3,3,3-tetrafluoropropene, from 0.5 to 250 ppm of 1,1,1,2,3-pentafluoropropene and from 0.5 to 100 ppm of 3,3,3-trifluoropropyne and from 1 to 150 ppm of compounds containing 2 or 3 carbon atoms, optionally comprising an olefinic bond (with the exclusion of HFO-1225ye and 3,3,3-trifluoropropyne).

According to a preferred embodiment of the invention, the POE(s) represent(s) between 10% and 50%, inclusive, by weight of the composition.

A subject of the present invention is also the use of the abovementioned composition in refrigeration, air conditioning, advantageously in motor vehicle air conditioning, and preferably in electric vehicles. In addition, this composition is thermally and/or chemically stable.

According to another preferred embodiment of the invention, the POE(s) represent(s) between 1% and 4%, inclusive, by weight of the composition. This composition preferably corresponds to that which circulates in the evaporator and the condenser of a motor vehicle air conditioning circuit.

EXPERIMENTAL SECTION

The thermal stability trials are carried out according to standard ASHRAE 97-2007: "sealed glass tube method to test the chemical stability of materials for use within refrigerant systems".

The test conditions are as follows:

Weight of fluid F: 2.2 g

Weight of lubricant: 5 g

Temperature: 200° C.

Duration: 14 days

The length of steel and the lubricant are introduced into a 4.2 ml glass tube. The tube is subsequently evacuated under vacuum and then the fluid F is added thereto. The tube is then welded in order to close it and placed in an oven at 200° C. for 14 days.

At the end of the test, various analyses are carried out:

the gas phase is recovered in order to be analysed by gas chromatography: the main impurities were identified by GC/MS (coupled gas chromatography/mass spectrometry). The impurities coming from the fluid F and those coming from the lubricant can thus be combined;

the length of steel is weighed (measurement of the rate of corrosion) and observed under a microscope;

the lubricant is analysed: colour (by spectrocolorimetry, Labomat DR Lange LICO220 model MLG131), water content (by Karl Fischer coulometry, Mettler DL37) and acid number (by quantitative determination with 0.01N methanolic potassium hydroxide).

Two commercial lubricants were tested: the oil PAG ND8 and the oil POE Ze GLES RB68. These lubricants initially contain 510 and 50 ppm of water, respectively.

Trials were then carried out by adding water so as to reach 1000 ppm of water in each lubricant.

The fluid F used for these trials contains 99.85% by weight of HFO-1234yf, 213 ppm of 3,3,3-trifluoropyne, 30 ppm of HFO-1225ye and 1257 ppm of compounds containing 2 or 3 carbon atoms, optionally comprising an olefinic bond.

|  | PAG ND8 | | POE Ze-GLES RB68 | |
| --- | --- | --- | --- | --- |
| Water content | 510 ppm | 1000 ppm | 50 ppm | 1000 ppm |
| Byproducts in the gas phase: | | | | |
| from the fluid F | 1000 ppm | 900 ppm | 300 ppm | 180 ppm |
| from the lubricant | 3% | 2.3% | 1000 ppm | 400 ppm |
| Rate of corrosion | <5 µm/year | <5 µm year | <5 µm/year | <5 µm/year |
| Observation of the length of steel | Shiny | Shiny | Shiny, slightly blue | Shiny, slightly blue |
| Analysis of the lubricant: | | | | |
| colour | 9 Gardner | 9.5 Gardner | 110 Hazen | 250 Hazen |
| water content | 1500 ppm | 4200 ppm | 250 ppm | 1100 ppm |
| acid number | 4.5 mg KOH/g | 5 mg KOH/g | 0.5 mg KOH/g | 0.2 mg KOH/g |

It is noted that, in the presence of the same moisture content, the fluid F is more stable in the presence of the POE.

The invention claimed is:

1. Composition comprising at least one lubricant based on polyol esters (POEs) and a refrigerant F comprising at least 99.8% by weight of 2,3,3,3-tetrafluoropropene, from 0.5 to 500 ppm of 1,1,1,2,3-pentafluoropropene, from 0.5 to 500 ppm of 3,3,3-trifluoropropyne and from 1 to 1500 ppm of compounds containing 2 or 3 carbon atoms.

2. Composition according to claim 1, characterized in that the refrigerant F comprises at least 99.9% by weight of 2,3,3,3-tetrafluoropropene, from 0.5 to 250 ppm of 1,1,1,2,3-pentafluoropropene, from 0.5 to 250 ppm of 3,3,3-trifluoropropyne and from 1 to 500 ppm of compounds containing 2 or 3 carbon atoms.

3. Composition according to claim 1, characterized in that the refrigerant F comprises at least 99.95% by weight of 2,3,3,3-tetrafluoropropene, from 0.5 to 250 ppm of 1,1,1,2,3-pentafluoropropene, from 0.5 to 100 ppm of 3,3,3-trifluoropropyne and from 1 to 150 ppm of compounds containing 2 or 3 carbon atoms.

4. Composition according claim 1, characterized in that said polyol esters (POEs) are formed from polyols having a neopentyl backbone.

5. Composition according to claim 1, characterized in that the POEs are obtained from a linear or branched carboxylic acid containing from 2 to 15 carbon atoms.

6. Composition according to claim 1, characterized in that said polyol esters (POEs) represent(s) between 10% and 50% by weight of the composition.

7. Composition according to claim 6, characterized in that said polyol esters (POEs) represent(s) between 1% and 4% by weight of the composition.

8. Composition according to claim 1, characterized in that said composition containing 2 or 3 carbon bonds comprises an olefine bond, excluding HFO-1225ye and 3,3,3-trifluoropropyne.

9. Composition according to claim 4, characterized in that said polyols having a neopentyl backbone is selected form the group consisting of neopentyl glycol, trimethylol propane, pentaerythritol, dipentaerythritol and mixtures thereof.

* * * * *